Figure 1:
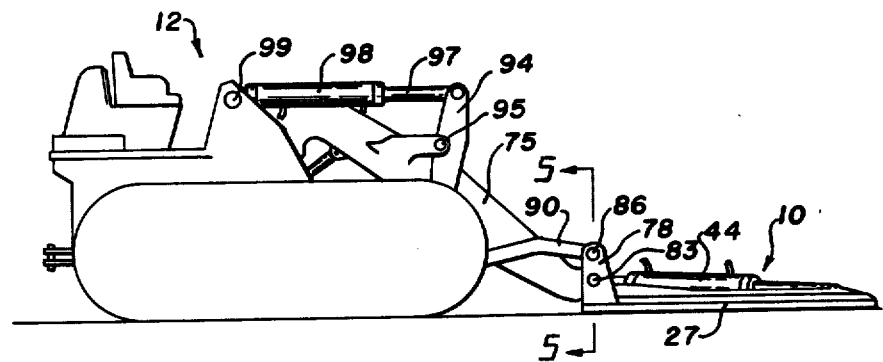

United States Patent

Anderson et al.

[11] 3,880,216
[45] Apr. 29, 1975

[54] METHOD AND APPARATUS FOR SHEARING TREES

[75] Inventors: Donald E. Anderson; James K. Yorston, both of Prince George, British Columbia; Thomas A. McLauchlan, Vancouver, British Columbia, all of Canada

[73] Assignee: Q.M. Machine Works Ltd., Prince George, British Columbia, Canada

[22] Filed: Oct. 16, 1973

[21] Appl. No.: 406,892

Related U.S. Application Data

[63] Continuation of Ser. No. 303,220, Nov. 2, 1972, abandoned.

[30] Foreign Application Priority Data
Nov. 5, 1971  Canada .................. 126941

[52] U.S. Cl. .................. 144/309 AC; 144/34 E
[51] Int. Cl. .................. A01g 23/00
[58] Field of Search ...... 144/3 D, 34 R, 34 A, 34 E, 144/309 AC

[56] References Cited
UNITED STATES PATENTS

| 3,327,745 | 6/1967 | Meece et al. | 144/34 E |
| 3,482,614 | 12/1969 | Jordan et al. | 144/34 E |
| 3,506,043 | 4/1970 | Fulghum | 144/34 E |
| 3,580,310 | 5/1971 | Frankenberg | 144/34 E |
| 3,590,894 | 7/1971 | Boyd et al. | 144/34 E |
| 3,626,477 | 12/1971 | Fulghum | 144/34 E |
| 3,627,002 | 12/1971 | Fulghum | 144/34 E |
| 3,646,975 | 3/1972 | McNeil et al. | 144/34 E |
| 3,674,066 | 7/1972 | Shields | 144/34 E |

*Primary Examiner*—Gerald A. Dost
*Attorney, Agent, or Firm*—Fetherstonhaugh & Co.

[57] ABSTRACT

A method of shearing or cutting down trees by slowly cutting into each tree from opposite sides thereof, and then rapidly completing the cut to fell the tree.

Apparatus for shearing or cutting down trees adapted to be mounted on a vehicle such as a tractor, and having means for cutting into each tree from opposite sides thereof, and means for protecting the cutting element and hydraulic operating system from obstacles such as stones, dirt and the like.

30 Claims, 10 Drawing Figures

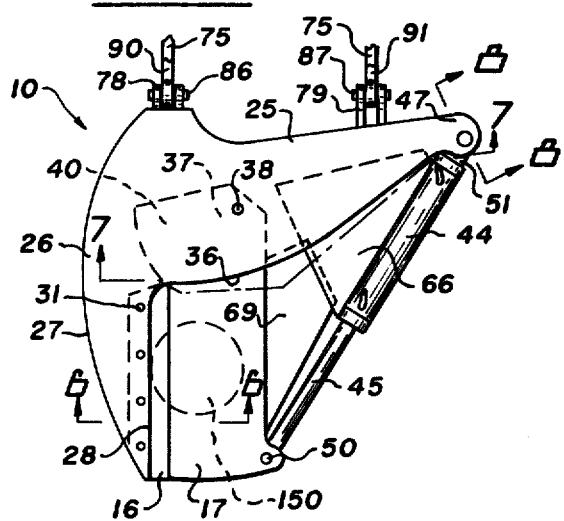
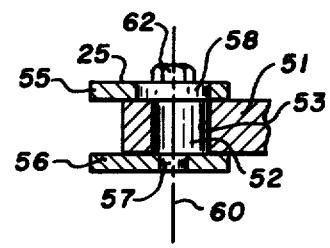
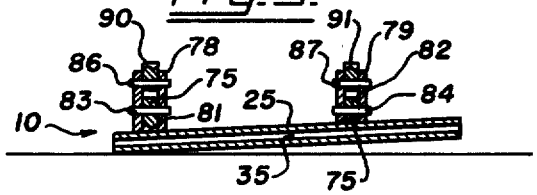
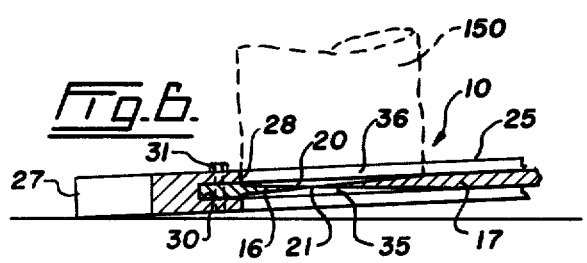
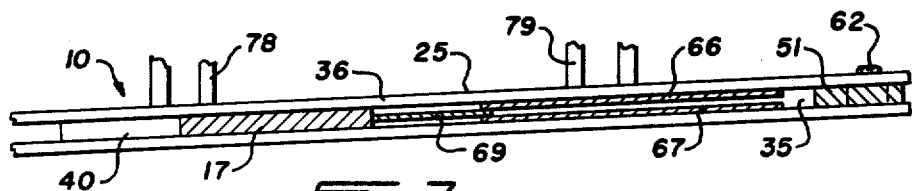

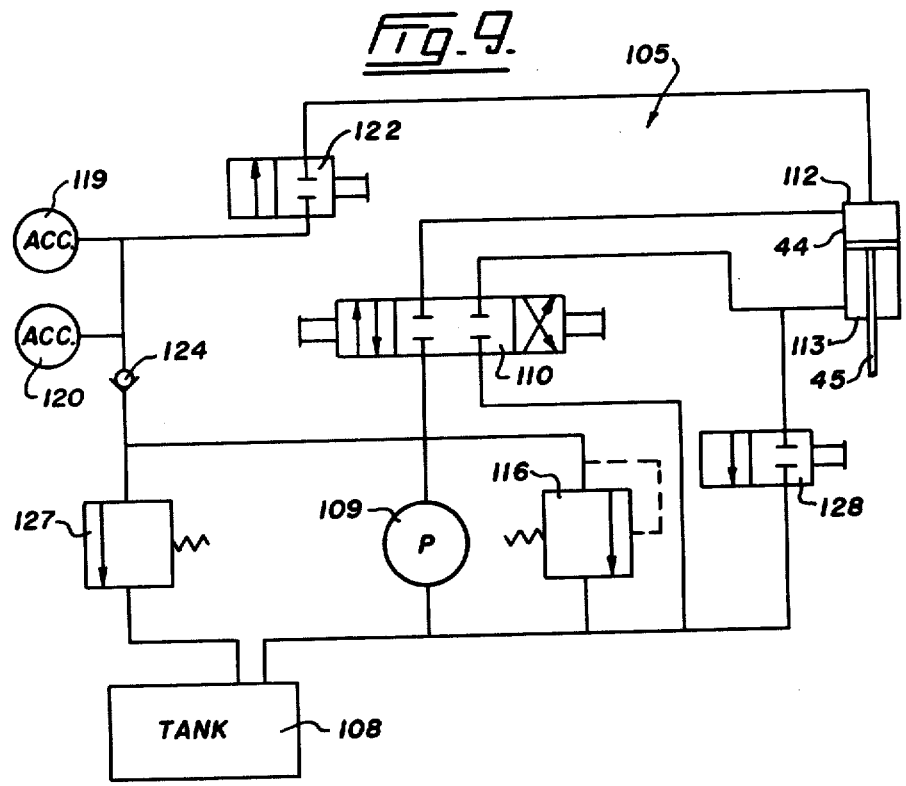
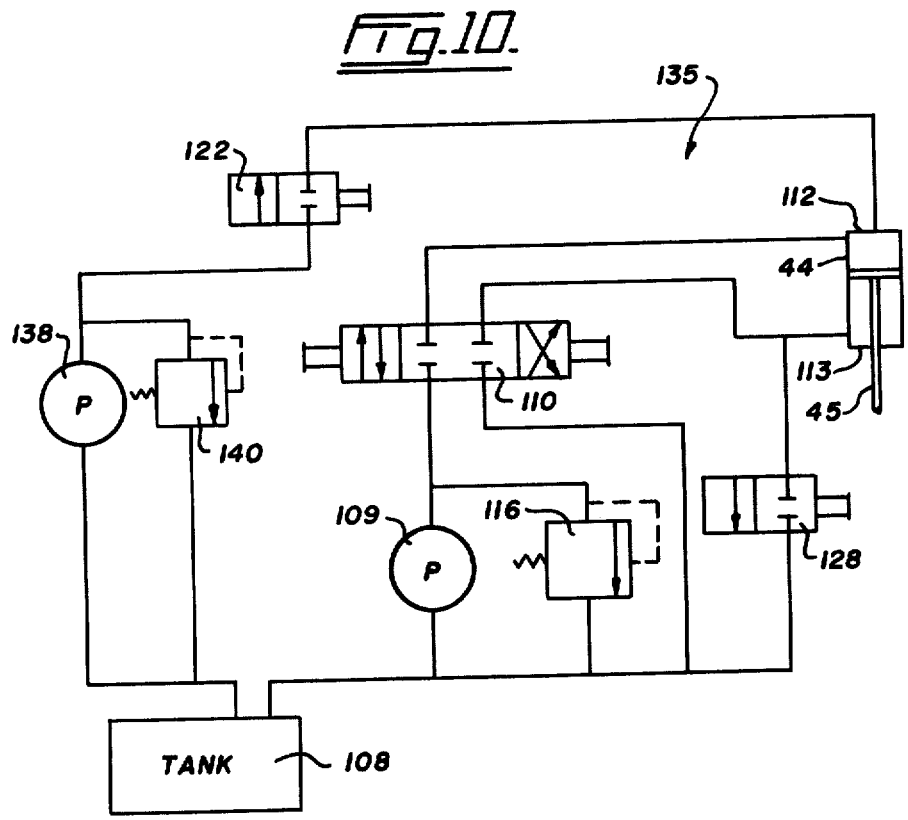

METHOD AND APPARATUS FOR SHEARING TREES

This is a continuation, of application Ser. No. 303,220 filed Nov. 2, 1972, and now abandoned.

This invention relates to a method of and apparatus for shearing trees. The apparatus can be mounted on a boom of a tractor or on any other hydraulically operated lifting apparatus mounted on a vehicle.

The tree shearing that has been done in the past has been done by devices which cut into each tree from one side thereof at a relatively slow speed. Such cutting produces a shattering, splitting and fibre elongation that extends further above the cut than is desirable or economical. Such damage, if noticed, is sometimes cut-off before the logic is processed, and when this is done in the forest, the cut-off end is usually left on the ground. If, on the other hand, the damage is not noticed and the logs are processed for lumber, this damage shows up as a blemish or split in the lumber and requires extensive trimming, resulting in a loss that is not desirable. With economical conditions as they are, it is essential to be able to process the entire log with as little waste as possible.

The tree shears of the prior art have the above-mentioned disadvantages. Although tree shears have the advantage of cutting the trees at ground level, the disadvantages up to date have outweighed the advantages.

The ultimate goal is to cut and fell a tree at ground level and to produce little or no damage to the fallen log. This has to be done at an economical rate. The method and the tree shearing device of the present invention enable trees to be cut rapidly at substantially ground level with very little, if any, shattering, splitting or fiber elongation. This shearing device also includes means for protecting the cutting elements and the hydraulic operating system from stones, dirt and the like.

With the present shearing method and apparatus it is possible to fell a standing tree with no damage to the butt of the tree, and without damage to the fibers in the log near the point of severance. The apparatus includes guards for keeping undesirable objects and dirt from lodging in the device. Furthermore, the hydraulic system of the apparatus is protected during the complete cutting cycle. The shearing device also includes mounting means which permits a change in the cutting plane so that the device can be used to cut logs on the ground and logs that are hung up on other trees or the like above the ground.

The method according to the present invention comprises cutting into the tree from opposite sides at a slow rate until the tree is about ready to fall, and then completing the cut at a rapid rate to prevent damage to the portion of the falling tree at the cut. It is preferable to cut into the tree on both sides in a laterally inclined plane relative to the tree. This results in the tree being undercut at one side, and when it starts to lean in the direction of the fall, the speed of the cut is then increased. This rapid cutting prevents the tree from splitting due to tension in the fibres when the tree starts to fall. The method will be more apparent from the following description relative to the tree shearing apparatus which has been developed to carry out this method.

Tree shearing apparatus according to the present invention comprises a stationary cutting blade, a movable cutting blade pivotally mounted for swinging movement towards and away from the stationary blade into closed and open positions respectively, said blades having cutting edges extending substantially parallel to each other when in the closed position, and the stationary blade having a shoulder spaced back from its cutting edge and away from the movable blade. Power means connected to the movable blade is adapted to swing this blade away from and towards the stationary blade to cut through a tree therebetween, the stationary blade undercutting the tree during movement of the movable blade through said tree. It is preferable to incline the blades transversely so that the movable blade swings downwardly towards the stationary blade when moving to the closed position. Suitable mounting means is provided for connecting the blade to vertically movable support means on a vehicle, this mounting being such as to permit the blades to be swung upwardly or downwardly relative to the support means.

The blades preferably project forwardly from a transverse support, and the power means preferably is a cylinder and piston power assembly extending between and connected to a portion of the transverse support and the movable blade. Movable guard means is provided which substantially fills the space between this power assembly, the movable blade and the support to prevent obstructive material from entering this space during operation of the device.

The preferred shearing apparatus includes means for selectively moving the movable blade towards the stationary blade at different speeds.

Figure 2:
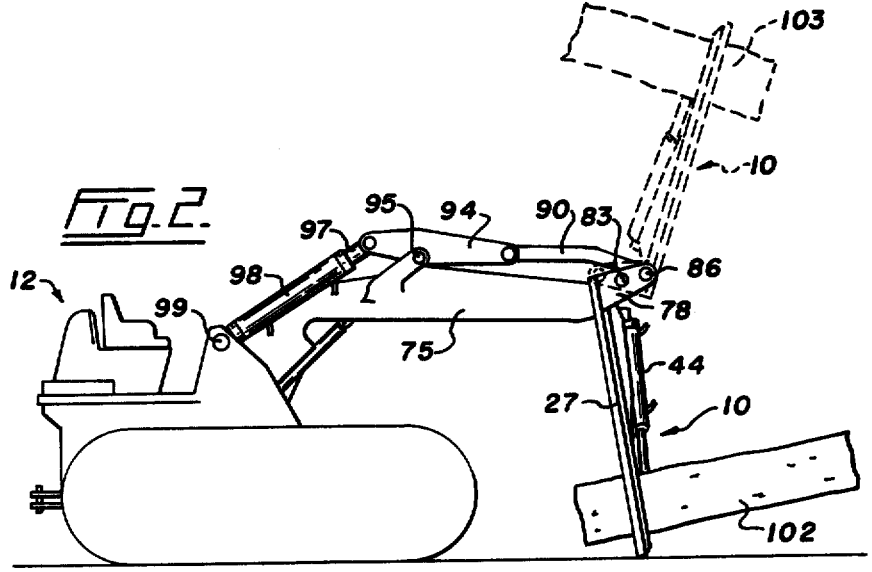
Figure 3:
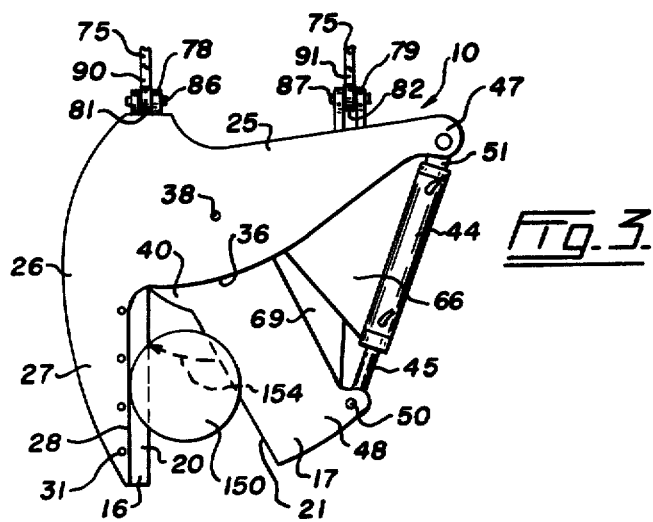

Preferred tree shearing apparatus according to this invention is illustrated in the accompanying drawings, in which FIG. 1 is a side elevation of the shearing device in normal operating position, and mounted on a suitable vehicle, such as a tractor, FIG. 2 is a side elevation of the shearing device and tractor, showing two additional and different cutting positions for the shearing device, FIG. 3 is a plan view of the cutting device with the blades near the open position, but having moved a short distance towards the closed position, FIG. 4 is a plan view of the shearing device with the cutting blades in the closed position, FIG. 5 is a sectional view taken on the line 5—5 of FIG. 1, but with the tractor omitted, FIG. 6 is an enlarged sectional view taken on the line 6—6 of FIG. 4, FIG. 7 is an enlarged sectional view taken on the line 7—7 of FIG. 4, FIG. 8 is an enlarged vertical section taken on the line 8—8 of FIG. 4, FIG. 9 diagrammatically illustrates a preferred form of variable speed power means for the shearing apparatus, and FIG. 10 illustrates an alternative form of variable speed power means.

Referring to the drawings, 10 is a tree shearing device in accordance with the present invention mounted on a suitable vehicle, such as a tractor 12. Although shearing device or apparatus 10 may have two blades which are movable towards each other in the manner of scissors blades, it is preferably made up of a stationary cutting blade 16 and a movable cutting blade 17, said blades having cutting edges 20 and 21, respectively, which come together and are substantially parallel to each other when the blades are in the closed position.

A suitable support is provided for these blades, and in this example, a transverse support 25 is provided for this purpose. Blade 16 projects forwardly from support 25 near end 26 thereof. This blade is actually carried by a projection 27 extending from the support throughout the length of the blade. Projection 27 forms a shoulder 28 spaced from cutting edge 20 thereof. It is preferable to make blade 16 removable, and in the illustrated example, the blade fits into a slot 30 formed in projection 27 and opening laterally therefrom, see FIG. 6. The blade is held in the slot in any suitable manner, such as by bolts 31.

A slot 35 is formed in support 25 and opens out from the forward edge 36 thereof, and the inner end 37 of movable blade 17 extends into this slot and is pivotally connected to the support by a suitable pin 38. The pivot point or pin 33 of blade 17 is offset to one side relative to blade 16, as clearly shown in FIGS. 3 and 4. A plate 40 is formed with blade 17 at its inner end and projects laterally therefrom, and this plate is shaped and positioned so that when the blade is moved into its open position, the plate moves into the portion of the slot 35 occupied when the blade is in the closed position to close this slot portion and thereby prevent dirt from entering into the slot at this point.

A power assembly is provided for swinging blade 17 between the open position, shown in FIG. 3 and the closed position, shown in FIG. 4. In this example, the power assembly comprises a hydraulic cylinder 44 and a piston rod 45 extending between the end 47 of support 25 and the outer end 48 of blade 17. In this example, piston rod 45 is connected to the blade by a pin 50, while a lug 51, connected to the opposite end of cylinder 44, projects therefrom into slot 35 of the transverse support at the end 47 of the latter. A rotary cam 52 fits in and extends through a hole 53 in lug 51. Cam 52 extends between upper and lower portions 55 and 56 of support 25, and has a pin 57 on its lower end journalled in portion 56, and a disc 58 on its upper end rotatably mounted in support portion 55. Pin 57 mounted in disc 58 are located on a common centreline 60 so that rotation of the disc rotates cam 52 to shift lug 51 and thereby cylinder 44 connected thereto back and forth relative to support 25. A head 62 may be provided on disc 58 by means of which the latter can be rotated. Rotation of cam 52 adjusts cylinder 44 and consequently blade 17 back and forth relative to blade 16.

Upper and lower guard plates 66 and 67 are secured to the side of cylinder 44 and project laterally therefrom into slot 35 of support 25. An intermediate plate 69 is secured to the back edge of movable blade 17 and extends away therefrom into the space between guard plates 66 and 67. From FIGS. 3 and 4, it will be seen that intermediate guard plate 69 extends from near piston rod 45 into slot 35 of support 25.

Suitable means is provided for mounting shearing device 10 on suitable supporting means carried by the vehicle to which the device is attached. In this example, shearing device 10 is mounted on the standard boom 75 of tractor 12. A pair of lugs 78 are mounted on and project upwardly from transverse support 25 near its end 26, and another pair of lugs 79 project upwardly from this support near its opposite end 47. Lugs 81 and 82 project from boom 75 into the spaces between lugs 78 and lugs 79 and are respectively connected to these lugs by pins 83 and 84, see FIGS. 1 and 5. Pins 86 and 87 connect the upper ends of lug pairs 78 and 79 to arms 90 and 91 mounted on and extending forwardly from tractor 12. Arms of this type and the operating mechanism therefor are standard equipment on many tractors.

As arms 90 and 91 are mounted and operated in the same manner, only one, namely arm 90, will now be described in detail, this arm being shown in FIGS. 1 and 2. Arm 90 extends inwardly of the tractor and is swingably connected to the lower end of a link 94 which is swingably mounted at 95 on the tractor boom 75. The upper end of link 94 is connected to the piston rod 97 of a hydraulic cylinder 98 which is swingably mounted on the tractor at 99. The hydraulic connections and controls for cylinder 98 have been omitted for the sake of clarity, since controls of this type are well known.

By referring to FIG. 5 it will be seen that lugs 79 are shorter than lugs 78 so that support 25 is inclined laterally when device 10 is in its normal shearing position. This causes blades 16 and 17 also to be inclined laterally.

Cylinder 44 may form part of any standard hydraulic system, in which case the operator would have a control valve for causing piston rod 45 to be extended or retracted in order to close or open the cutting blades. However, it is preferable to be able to operate cylinder 44 at different speeds, and FIG. 9 illustrates a preferred hydraulic system 105 for this purpose.

System 105 includes a tank or reservoir 108, a power driven pump 109 and a normally closed 4-way control valve 110. Valve 110 can be operated selectively to direct pressure fluid from pump 109 to either of the ends 112 and 113 of cylinder 44, and at the same time to return fluid from the opposite ends of the cylinder to the tank. A relief valve 116 is connected between the pressure side of pump 109 and the tank. Valve 110 can be a speed-control valve, that is, it can be made to control the rate of flow of fluid to and from the cylinder.

When control valve 110 is operated to direct pressure fluid to end 112 of cylinder 44, piston rod 45 is extended to cause blade 17 to move toward blade 16. When the pressure fluid is direct to end 113 of the cylinder, the blades are opened.

One or more accumulators can be connected to end 112 of cylinder 44. In this example, there are two parallel accumulators 119 and 120. A normally-closed 2-way valve 122 is located in the line between the accumulators and the cylinder. Pump 109 is connected to direct fluid to the accumulators through a check valve 124.

An unloading valve 127 is provided between check valve 124 and tank 108, while a normally-closed 2-way dumping valve 128 is provided between end 113 of cylinder 44 and the tank.

With the hydraulic system 105, the cutting blades 16 and 17 are closed and opened at a relatively slow speed by means of control valve 110. When it is desired to accelerate the rate of closing of the blades, valve 122 is operated to discharge accumulators 119 and 120 into the end 112 of cylinder 44 to greatly increase the pressure and volume against the piston of rod 45.

FIG. 10 illustrates an alternative hydraulic system 135 which is similar to system 105, excepting that the accumulators 119 and 120 and check valve 124 are replaced by a second pump 138 which is connected to end 112 of cylinder 44 through the valve 122. Pump 138 draws fluid from tank 108, and a pressure relief valve 140 is provided between the pressure side of this pump and the tank. With this arrangement, pump 109 is a low volume pump, while 138 is a high volume pump.

There are other hydraulic systems that may be used to control and operate cylinder 44. For example, a variable delivery pump system could be used, or one having two pumps and accumulators.

When hydraulic system 135 is employed, the blades are closed and opened at a relatively slow speed by valve 110 which is operated to direct fluid from pump 109 to the desired end of the operating cylinder. When it is desired to close the blades at an accelerated rate, valve 122 is operated to direct fluid from the high volume pump 133 to the cylinder for this purpose.

When it is desired to cut down a tree at substantially ground level, boom 75 of the tractor is lowered by the usual control system of the tractor to shift shearing device 10 into a substantially horizontal position near ground level, as shown in FIG. 1. Although shearing apparatus 10 is in a generally horizontal position, it is inclined laterally to the ground, as clearly shown in FIG. 5. Blade 17 is moved to the open position by cylinder 44, and then the tractor is operated to move the shearing apparatus forwardly until a tree trunk is positioned between the cutting edges of open blades 16 and 17. Cylinder 44 is now operated to move blade 17 towards the closed position, at which time the blade cuts through the tree trunk. As support 25 and its projection 27 are holding blade 17 substantially stationary at this time, the reaction to the movement of blade 17 causes blade 16 to move into the tree, as shown in FIGS. 3 and 4. As a result of the fact that the transverse support and the cutting blades are inclined laterally, blade 17 actually moves across and downwardly of the tree trunk towards blade 16.

As stated above, operating cylinder 44 may form part of a conventional hydraulic system. However, it is preferable to control this cylinder by means of hydraulic system 105 of FIG. 9. With this system, valve 110 is operated to direct fluid from pump 109 to cylinder 44, thereby moving blade 17 towards blade 16 at a relatively slow speed. When blade 17 contacts tree 150, which is located between the cutting blades, it starts to cut into the tree while at the same time causing blade 16 to cut into the tree until the latter engages shoulder 28. This in effect undercuts the tree, since blade 16 cuts upwardly towards blade 17. When the operator feels that the tree is leaning in the direction of fall, he operates valve 122 to discharge the accumulators into the operating cylinder, thereby obtaining rapid cutting for the balance of the cut. This ensures the tree falling in the desired direction, but what is more important, the rapid cutting prevents the tree from splitting due to the tension which is normally developed in the fibers if the cutting is done at the rate of the intial cut. In addition, a much cleaner cut is obtained by the high speed cutting.

The hydraulic system 135 of FIG. 10 also provides for two speed cutting. The initial cut is made in the manner described above, and then the rapid cut is made by operating valve 122 to connect pump 138 to the operating cylinder.

Hydraulic system 135 has the drawback that it is necessary to have sufficient engine horsepower to drive both pumps during the cutting action. On the other hand, hydraulic system 105 has the advantage that the accumulators can be charged while the traction unit is moving from one tree to another. Thus, much less engine horsepower is required for this system than for system 135.

By referring to FIG. 3 it will be seen that when blade 17 is moved to the open position, guard plate 40, which is attached thereto, swings with it to keep slot 35 of support 25 closed, thereby preventing dirt from entering the slot to cause trouble when the blade is moving during the cutting operation. It will be noted that the space bounded by cylinder 44, piston rod 45, blade 17 and support 23 is completed closed by guard plates 66, 67 and 69. As the cylinder swings in a substantially horizontal plane during the closing and opening of the blades, plates 66 and 67 move within the support slot so as not to interfer with this movement. At the same time, intermediate guard plates 69 can move relative to plates 66 and 67 and support 25. With this arrangement, stones and other obstacles cannot get into the space between the power assembly and the support to cause damage to any of the movable elements of this apparatus.

It will be noted from FIG. 6 that the cutting edges of blades 16 and 17 come together at the end of the cutting operation. Cutting edge 21 can be adjusted relative to cutting edge 20 by rotating cam 52 to shift the power assembly and the movable blade relative to the stationary blade.

As mentioned above, the pivot point 38 of blade 117 is off-set laterally relative to blade 116. As a result of this, when blade 17 moves towards blade 16 there is a slicing action at its cutting edge, that is, the cutting edge not only moves towards the cutting edge of blade 16 but it moves inwardly relative to this edge, as indicated by arrow 154 in FIG. 3. As is well known, it is much easier to cut through an object when the cutting blade is drawn longitudinally relative to the object as it is pressed through the latter.

Shearing apparatus 10 can be tipped up and down relative to the tractor boom 75 by operating cylinder 98. As the shearing device is supported by pins 83 and 84 on the boom, and as operating arm 90 is connected to the lugs above pin 86, movement of arm 90 inwardly and outwardly relative to the tractor and the shearing device swings the latter upwardly and downwardly relative to the boom.

When boom 75 is raised, as shown in FIG. 2, shearing device 10 can be swung downwardly so as to be able to cut a log 102 lying on or substantially parallel with the ground. Arm 90 is extended at this time. By retracting arm 90, device 10 can be swung upwardly to the position shown in dotted lines in FIG. 2 to cut a log 103 which may be hung in a tree, a common occurrence in the woods. Thus a snag or a hang-up can be cut by this shearing apparatus without any one getting too close to the log being cut.

We claim:

1. The method of shearing trees which comprises cutting into the tree from opposite sides at a slow rate until the tree is about ready to fall, and then selectively completing the cut at a rapid rate to prevent damage to the portion of the falling tree at the cut.

2. The method as claimed in claim 1 in which the cutting into the tree is done in a plane inclined laterally of the cutting action and relative to the tree.

3. The method as claimed in claim 1 in which said cutting is by a pair of opposed blades, one of which moves towards the other.

4. The method as claimed in claim 2 in which said cutting is by a pair of opposed blades, one of which moves towards the other.

5. Tree shearing apparatus adapted to be mounted for horizontal movement on and projecting from a vehicle, comprising a pair of opposed cutting blades, multi-speed power means connected to one of said blades and selectively operable to move said one blade towards the other of said blades successively at different speeds.

6. Tree shearing apparatus as claimed in claim 5 in which said blades are mounted to cut in a plane inclined transversely of the blades whereby said one blade moves along the incline towards said other blade.

7. Tree shearing apparatus as claimed in claim 6 in which said power means comprises a hydraulic cylinder and piston rod therefor extending between and connected to said one blade and a fixed element, pump means connected to the cylinder for directing hydraulic fluid to the cylinder to move the piston rod and said one blade towards said other blade, and accumulator means connected to the cylinder for moving the piston rod and said one blade at an accelerated rate.

8. Tree shearing apparatus as claimed in claim 6 in which said power means comprises a hydraulic cylinder and piston rod therefor extending between and connected to said one blade and a fixed element, first pump means connected to the cylinder for directing hydraulic fluid to the cylinder to move the piston rod and said one blade towards said other blade, and second pump means connected to the cylinder for moving the piston rod and said one blade at an accelerated rate.

9. Tree shearing apparatus as claimed in claim 6 in which said movable blade is mounted to swing around a pivot which is offset relative to the other of said blades so that there is a slicing action during movement of the movable blade.

10. Tree shearing apparatus as claimed in claim 5 in which said power means comprises a hydraulic cylinder and piston rod therefor extending between and connected to said one blade and a fixed element, pump means connected to the cylinder for directing hydraulic fluid to the cylinder to move the piston rod and said one blade towards said other blade, and accumulator means connected to the cylinder for moving the piston rod and said one blade at an accelerated rate.

11. Tree shearing apparatus as claimed in claim 5 in which said power means comprises a hydraulic cylinder and piston rod therefor extending between and connected to said one blade and a fixed element, first pump means connected to the cylinder for directing hydraulic fluid to the cylinder to move the piston rod and said one blade towards said other blade, and second pump means connected to the cylinder for moving the piston rod and said one blade at an accelerated rate.

12. Tree shearing apparatus as claimed in claim 5 in which said movable blade is mounted to swing around a pivot which is offset relative to the other of said blades so that there is a slicing action during movement of the movable blade.

13. Tree shearing apparatus as claimed in claim 5 in which said means for selectively moving the movable blade comprises pump means and accumulator means respectively.

14. Tree shearing apparatus as claimed in claim 5 in which said power assembly includes pump means connected to the cylinder for directing hydraulic fluid to the cylinder to move the piston rod and the movable blade, and accumulator means connected to the cylinder for moving the piston rod and movable blade at an accelerated rate.

15. Tree shearing apparatus as claimed in claim 14 in which said movable blade is mounted to swing around a pivot which is offset relative to the other of said blades so that there is a slicing action during movement of the movable blade.

16. Tree shearing apparatus as claimed in claim 5 in which said power assembly includes first pump means connected to the cylinder for directing hydraulic fluid to the cylinder to move the piston rod and the movable blade, and second pump means connected to the cylinder for moving the piston rod and the movable blade at an accelerated rate.

17. Tree shearing apparatus as claimed in claim 16 in which said movable blade is mounted to swing around a pivot which is offset relative to the other of said blades so that there is a slicing action during movement of the movable blade.

18. Tree shearing apparatus as claimed in claim 5 including a transverse support, said blades being mounted on and projecting outwardly from the support, and said power means comprising a cylinder and piston rod power assembly extending between and connected to the support and to said movable blade near the end thereof remote from the support for swinging the latter blade towards the other of said blades to cut through a tree therebetween, a pair of spaced-apart outer plates connected to said cylinder and slidably extending into a slot in the support, and an intermediate plate connected to the movable blade and extending between said outer plates, said outer plates and intermediate plate substantially filling the space between the power assembly, the movable blade and the support to prevent obstructive material from entering said space during operation of the device.

19. Tree shearing apparatus as claimed in claim 5 including a transverse support, said blades being mounted on and projecting outwardly from the support, said end of said movable blade connected to the support extending into a slot within the support, and said power means comprising a cylinder and piston rod power assembly extending between and connected to the support and to said movable blade for swinging the latter blade towards the other of said blades to cut through a tree therebetween, and a plate connected to said movable blade within the support slot and shaped to remain in and close said slot when the movable blade is swung to the open position to keep dirt out of the slot.

20. Tree shearing apparatus as claimed in claim 5 including a transverse support, said blades being mounted on and projecting outwardly from the support, and said power means comprising a cylinder and piston rod power assembly extending between and connected to the support and to said movable blade for swinging the latter blade towards the other of said blades to cut through a tree therebetween, and cam means connecting the power assembly to the transverse support for adjusting the assembly and movable blade connected thereto towards and away from the other of said blades.

21. Tree shearing apparatus comprising a substantially horizontal support, a transverse slot formed in said support between top and bottom surfaces thereof and opening out from an edge of the support, a first cutting blade extending longitudinally outwardly from the support, a second cutting blade extending at an inner end thereof into the slot of the support adjacent the first blade and extending outwardly from the support towards an outer end, means siwngably connecting said inner end of the second blade to the support, said second blade extending substantially parallel to the first blade and being movable back and forth towards and away from the latter into closed and open positions for cutting purposes, power means connected to the second blade near the outer end thereof and to the support on the side of said connecting means remote from the first blade for moving the second blade back and forth, and guard means at the inner end of the second blade within the support slot for preventing obstructive material from getting into the slot when the second blade moves to the open position.

22. Tree shearing apparatus as claimed in claim 21 in which said guard means comprises a plate connected to the inner end of the second blade and slidably fitting in the support slot, said plate being shaped and positioned so that when said second blade is moved into the open position the plate moves into the portion of said slot occupied by the second blade when in the closed position to close this slot portion.

23. Tree shearing apparatus as claimed in claim 21 in which said guard means comprises a plate connected to the second blade within the support slot and shaped to remain in and close said slot when the second blade is swung to the open position to keep dirt out of the slot.

24. Tree shearing apparatus as claimed in claim 21 in which said power means comprises a cylinder and rod power assembly extending between and pivotally connected at opposite ends thereof to the second blade and the support.

25. Tree shearing apparatus as claimed in claim 24 including movable guard means substantially filling the space between the power assembly, the second blade and the support to prevent obstructive material from entering said space during operation of the device.

26. Tree shearing apparatus as claimed in claim 25 in which said movable guard means comprises a pair of spaced-apart plates connected to the cylinder and slidably extending into the slot in the support and an intermediate plate connected to the second blade and extending between said outer plates, said outer plates and intermediate plate substantially filling the space between the power assembly, the second blade and the support.

27. Tree shearing apparatus as claimed in claim 25 including cam means connecting the power assembly to the support for adjusting the assembly and the second blade connected thereto towards and away from the first blade.

28. Tree shearing apparatus as claimed in claim 21 including movable guard means substantially filling the space between said power means, the second blade and the support to prevent obstructive material from entering said space during operation of the device.

29. Tree shearing apparatus as claimed in claim 28 in which said movable guard means comprises a pair of spaced-apart plates connected to said power means and slidably extending into the slot in the support and an intermediate plate connected to the second blade and extending between said outer plates, said outer plates and intermediate plate substantially filling the space between the power means, the second blade and the support.

30. Tree shearing apparatus as claimed in claim 21 including cam means connecting the power means to the support for adjusting said power means and the second blade connected thereto towards and away from the first blade.

* * * * *